(12) United States Patent  (10) Patent No.: US 12,537,741 B2
Morrison  (45) Date of Patent: Jan. 27, 2026

(54) TEMPLATE XSLT BASED NETCONF DATA COLLECTOR

(71) Applicant: FRONTIER COMMUNICATIONS HOLDINGS, LLC, Dallas, TX (US)

(72) Inventor: Nicholas S. Morrison, Trucksville, PA (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/128,135

(22) Filed: Mar. 29, 2023

(65) Prior Publication Data

US 2024/0333592 A1     Oct. 3, 2024

(51) Int. Cl.
*G06F 9/445*         (2018.01)
*H04L 12/24*       (2006.01)
(Continued)

(52) U.S. Cl.
CPC .......... *H04L 41/084* (2013.01); *H04L 67/133* (2022.05); *H04L 67/141* (2013.01)

(58) Field of Classification Search
CPC .... H04L 41/084; H04L 67/133; H04L 67/141
(Continued)

(56) References Cited

U.S. PATENT DOCUMENTS 8,248,958 B1 * 8/2012 Tulasi ............... H04L 43/50
370/241
10,250,441 B2 * 4/2019 Liu ................... H04L 41/022
(Continued)

FOREIGN PATENT DOCUMENTS

CN     101321080 B   *   7/2010   ......... H04L 41/0843

OTHER PUBLICATIONS

Z. Yang, B. Zhang, G. Li, Y. Li and X. Gao, "The implementation and comparison analysis of subtree filtering and Xpath capability in NETCONF," 2009 IEEE International Conference on Network Infrastructure and Digital Content, Beijing, China, 2009, pp. 921-925, doi: 10.1109/ICNIDC.2009.5360806, 2009 (Year: 2009).*

*Primary Examiner* — Umar Cheema
*Assistant Examiner* — Golam Mahmud
(74) *Attorney, Agent, or Firm* — MARSHALL, GERSTEIN & BORUN LLP (57) ABSTRACT

Disclosed herein are system, method, and computer program product embodiments for a template XSLT (extensible stylesheet language transformation) based NETCONF (network configuration protocol) data collector. An embodiment operates by sending, by a network management device, a NETCONF request to a first network element and a first network element, where the NETCONF request is generated based on a configuration file corresponding to the first network element and the first network element. The embodiment generates a stylesheet corresponding to the NETCONF configuration file. The embodiment receives a first NETCONF reply message and a second NETCONF reply message, where the first NETCONF reply message is generated by the first network element in response to receiving the NETCONF request, and the second NETCONF reply message is generated by the first network element in response to receiving the NETCONF request. The NETCONF reply message and the second NETCONF reply message are transformed into a delimited data format using the stylesheet.

17 Claims, 6 Drawing Sheets

(51) Int. Cl.
  *H04L 12/26*  (2006.01)
  *H04L 41/084*  (2022.01)
  *H04L 67/133*  (2022.01)
  *H04L 67/141*  (2022.01)

(58) Field of Classification Search
  USPC .......................................................... 709/220
  See application file for complete search history.

(56) References Cited

U.S. PATENT DOCUMENTS

| | | | |
|---|---|---|---|
| 11,687,355 B1* | 6/2023 | Mukherjee | H04L 67/10 709/221 |
| 2006/0031434 A1* | 2/2006 | Tindal | H04L 41/22 709/220 |
| 2010/0049837 A1* | 2/2010 | Ji | H04L 41/0843 715/236 |
| 2016/0350095 A1* | 12/2016 | Ramachandran | G06F 8/65 |
| 2016/0357702 A1* | 12/2016 | Shamis | G06F 15/167 |
| 2017/0187577 A1* | 6/2017 | Nevrekar | H04L 41/0226 |
| 2019/0245732 A1* | 8/2019 | Luo | H04L 41/0859 |
| 2022/0239572 A1* | 7/2022 | Tao | H04L 41/0631 |
| 2022/0247655 A1* | 8/2022 | Ji | H04L 43/0829 |

* cited by examiner

FIG. 1

```
<filter type="subtree" >
  <system xmlns="http://example.net/yang/system" >
    <config>
      <hostname/>
    </config>
    <state>
      <uptime xmlns="http://www.augment.com/ns/yang/augment-uptime"/>
    </state>
  </system>
  <test-qos xmlns:alias1="urn:test:level:xml:ns:yang:test_ns::example-test-qos">
    <list_name1>
      <name/>
      <cir/>
      <cbs/>
      <eir/>
      <ebs/>
    </list_name1>
  </test-qos>
  <test-qos xmlns:alias2="urn:test:level:xml:ns:yang:test_ns::example-test-qos">
    <list_name2>
      <name/>
      <element1/>
      <instance-id/>
    </list_name2>
  </test-qos>
</filter>
```

TEMPLATE XSLT BASED NETCONF DATA COLLECTOR

BACKGROUND

Network management involves configuring, monitoring, updating, and troubleshooting network devices. Network engineers use network management systems to collect data from various network devices, such as switches, routers, access points, gateways, and firewalls. The data collected from these devices is used to proactively identify performance issues and accelerate troubleshooting. Network management systems provide network engineers with fine-grained control over how those devices operate and interact with one another. However, enterprise networks may comprise equipment from diverse vendors, and as the number and the diversity of devices in a network increase, device monitoring and collecting data become more complex.

BRIEF DESCRIPTION OF THE DRAWINGS

The accompanying drawings are incorporated herein and form a part of the specification.

FIG. 2 illustrates an example NETCONF configuration file using XML subtree filtering, according to some aspects of this disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a template extensible stylesheet language transformation (XSLT) based network configuration protocol (NETCONF) data collector. For example, embodiments herein describe a data collection process that uses an extensible markup language (XML) configuration file to dynamically build an XSLT stylesheet for transforming received data into a format that is optimized for consumption by a network management system that manages a heterogeneous network that utilizes different device and data types.

NETCONF is a standard-based network management protocol that provides mechanisms to install, manipulate, and delete the configuration of network devices. A network administrator can use NETCONF for configuring or requesting operational data from a network device. A data modeling language called "Yet Another Next Generation" (YANG) is used to model configuration and state information used by NETCONF operations. NETCONF uses a remote procedure call (RPC) based mechanism to facilitate communication of YANG formatted data between a NETCONF client (e.g., a network management system) and a NETCONF server (e.g., a network device).

An enterprise network may comprise network devices from diverse vendors. One of the challenges of managing a heterogeneous network is that different vendors often support different YANG models for the same or similar operations. Furthermore, different product families from the same vendor may support different YANG models. In addition, network administrators may employ customized data processing tools that may have a preferred data ingestion format and/or layout. Since there may not be a consistent set of YANG models supported across the different vendor equipment, network management systems may generate model and/or vendor-specific configuration files for requesting operational data from various network devices and convert the received data into a preferred format and/or layout. Hence, as the number and diversity of devices connected to the network increase, monitoring and collecting data may become extremely complex.

To solve the above technological problem, embodiments describe a collection process to retrieve data from a network element using the NETCONF protocol and convert the received YANG formatted data into a preferred data format and layout. The collection process uses a collection script that is independent of the vendor, model, and version of the network devices. According to some aspects, the collection script is used to dynamically build an XSLT stylesheet from an XML configuration file. The generated XSLT stylesheet can be used to transform the YANG-based data received for the NETCONF server into a data ingestion format and/or layout. Furthermore, the collection script can dynamically generate an XSLT stylesheet such that any changes to a configuration file can automatically update the formatting portion of the collection process, which may be without manual intervention.

Embodiments describe a network management device sending one or more NETCONF requests to a network element, where the NETCONF requests are generated based on a configuration file corresponding to the network element. Embodiments describe generating a stylesheet corresponding to the NETCONF configuration file based on the configuration file. In some embodiments, the network management device receives one or more NETCONF reply messages and uses the stylesheet to transform the received YANG data into a preferred delimited data format.

Figure 1:
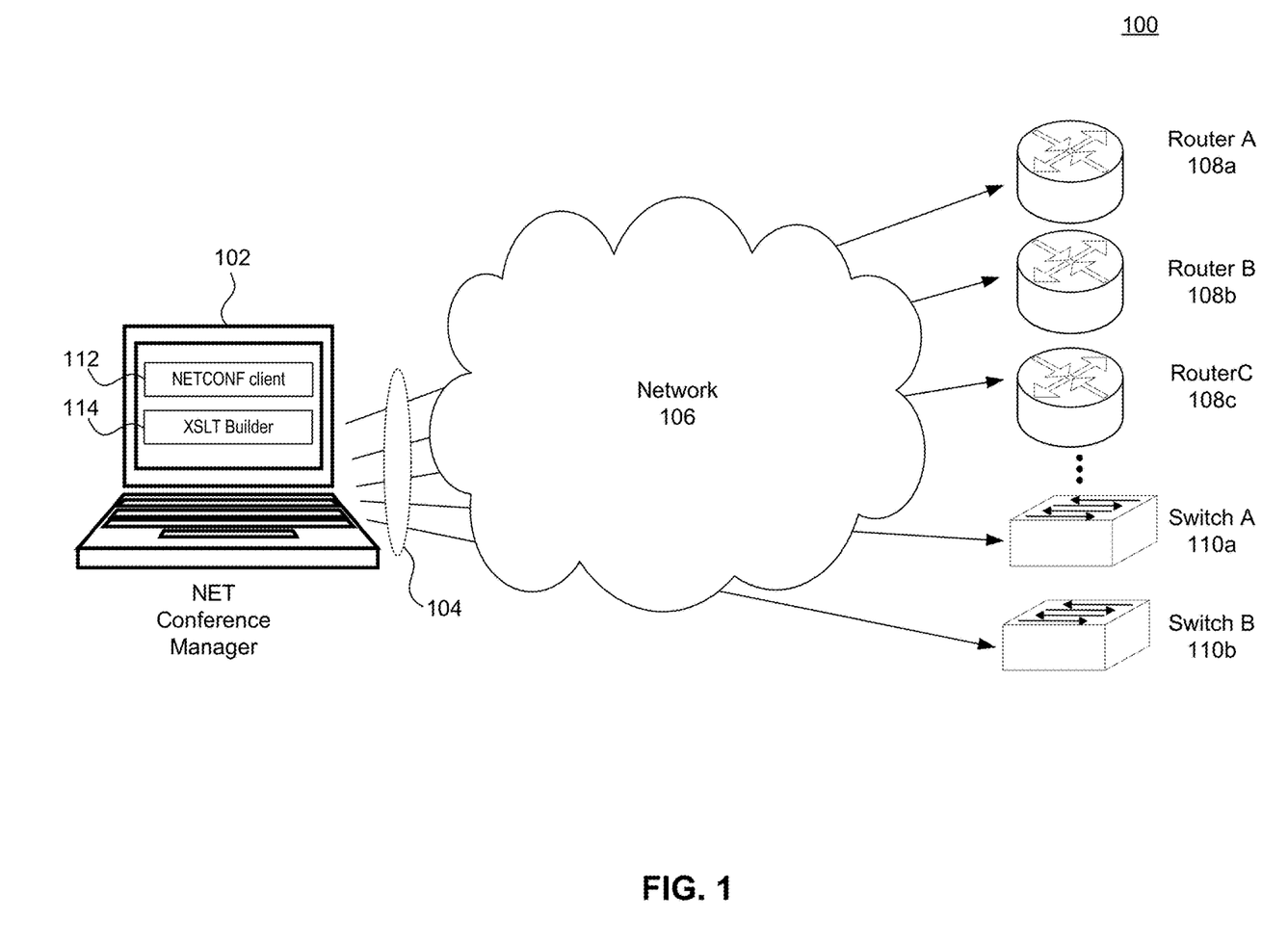
FIG. 1 illustrates an example system of a telecommunication network, according to some aspects of this disclosure.

FIG. 1 illustrates an example system 100 of a telecommunication network, according to some aspects of this disclosure. System 100 may include a NETCONF manager 102, network 106, and network elements 108 *a-c* and 110 *a-b*. NETCONF manager 102 may communicate with network elements 108 *a-c* and 110 *a-b* using network 106. NETCONF manager 102 may communicate with a network element using a wired link 104 (e.g., coaxial cable, Ethernet cable, fiber optic cable, etc.), wireless link and/or combinations thereof. According to some aspects, a network element may be a router, switches, bridge, network gateway, firewalls, aggregator device (e.g., broadband network gateway (BGN) or Broadband Remote Access Server (B-RAS)), and/or the like. In some embodiments, network elements 108 *a-c* may be implemented as a first type of network device and network elements 110 *a-b* may be implemented as a second type of network device. As one example, network elements 108 *a-c* may be implemented as router A, router B, and router C and network elements 110 *a-b* may be implemented as switch A and switch B. Additionally, the network elements may be interconnected via communication links to exchange information. According to some aspects, a network administrator may manage NETCONF manager 102 and network elements 108 a-c and 110 a-b. According to some aspects, management of network 106 and network elements 108 a-c and 110 a-b may be automated using a software defined networking (SDN) controller.

According to some aspects, NETCONF manager 102 includes a NETCONF client 112 and an XSLT builder 114. NETCONF client 112 and/or XSLT builder 114 may be implemented as a script or an application running at NETCONF manager 102. According to some aspects, each one of the managed network elements 108 a-c and 110 a-b may include an embedded NETCONF agent that acts as a NETCONF server. According to some aspects, the NETCONF agent responds to requests for information and/or configuration requests from the NETCONF manager 102.

Communication between the NETCONF client 112 and server may be session based. According to some aspects, the NETCONF client 112 at NETCONF manager 102 establishes a NETCONF session (e.g., an SSH session) with a NETCONF server at a network element (e.g., network elements 108 a-c). Each network element of network elements 108 a-c and network elements 110 a-b may support multiple NETCONF sessions. According to some aspects, the NETCONF client 112 and server exchange NETCONF messages that are encoded in XML (Extensible markup language) format. NETCONF messages may be either a remote procedure call (RPC) or an RPC-reply. Each RPC may be a request from the NETCONF client 112 for the NETCONF server to execute a specified NETCONF operation. According to some aspects, the name and parameters of an RPC are encoded as the contents of a <rpc> tag. The name of the RPC may be an element directly inside the <rpc> element, and any parameters may be encoded inside this element. The <rpc-reply> message may be sent by the NETCONF server in response to a <rpc> message. A NETCONF server may also return any additional attributes included in the <rpc> element unmodified in the <rpc-reply> element. The response data may be encoded as one or more child elements to the <rpc-reply> element.

According to some aspects, to obtain configuration data and/or state information of a target network element, NETCONF client 112 may send an <get> RPC request to the NETCONF server at the target network element. NETCONF client 112 may obtain configuration data using an <get-config> RPC request. According to some aspects, configuration and state data of network elements are specified using YANG data modules that have a hierarchical tree-based structure. The NETCONF request and the response contents are described in XML schemas, allowing the client and server to recognize the syntax constraints imposed on the exchange. Depending on the device's capabilities, the content data elements may be represented by a native YANG model, an Open Config YANG model, or some other vendor specific data model.

According to some aspects, each network element (e.g., network elements 108 a-c and 110 a-b) may include one or more datastores that store configuration data, operational data, and/or collected statistics data as YANG data modules. A datastore may be a database that contains network device management data. According to some aspects, a network element may store configuration data in a running configuration datastore, a candidate configuration datastore, and/or a startup configuration datastore. Each network element (e.g., network elements 108 a-c and 110 a-b) includes an operational datastore that contains all configuration elements that are currently in use. According to some aspects, NETCONF client 112 can request data corresponding to the volume of traffic experienced by network elements 108 a-c and 110 a-b. According to some aspects, NETCONF client 112 may collect network-wide information corresponding to various resource demands generated by various elements. Furthermore, NETCONF client 112 can collect parameters such as supported bit rates, modulation formats, operational bandwidths, and/or the like from network elements 108 a-c and 110 a-b.

According to some aspects, to request the most recent configuration and state information of a network element, NETCONF client 112 encloses the <get> tag in an <rpc> tag element. According to some aspects, by including the <filter> tag element and appropriate child tag elements, the NETCONF client 112 can request specific portions of the configuration. If the <filter> element is omitted, the server returns the entire configuration. According to some aspects, the configuration file includes one or more tag elements, each tag element representing a particular request (e.g., operational request tag elements, configuration request tag elements, and/or the like).

FIG. 2 shows an example NETCONF configuration file using XML subtree filtering, according to some aspects. According to some aspects, NETCONF configuration file 200 may include an operational request or a configuration information request, and/or a configuration change request. Operational requests may be requests for information about the status of the network device. Configuration information requests may be requests for information about the network device's candidate configuration or running configuration (i.e., committed configuration—the configuration currently in active use on the network device.) NETCONF protocol defines <get> and <get-config> operations for retrieving configuration information. According to some aspects, an RPC request includes elements of configuration file 200. An RPC request can use elements of configuration file 200 as a filter. According to some aspects, NETCONG client 112 can read in the configuration file 200 as a string and set a filter element in an <get> RPC request to one or more components of the string corresponding to the read-in configuration file 200.

According to some aspects, a NETCONF configuration file 200 using XML subtree filtering may comprise one or more subtree filters. A subtree filter may be comprised of XML elements and their XML attributes. XML subtree filtering is a mechanism that allows a client application to select particular XML subtrees to include in the <rpc-reply> for a <get> or <get-config> operation. Using subtree filtering, a client application can request specific portions of the configuration by including appropriate filter components.

According to some aspects, each subtree filter may include one or more of the following components: namespace selection, attribute match expressions, containment nodes, selection nodes, and content match nodes. According to some aspects, if namespaces are used in the subtree filter, then the filter output will include only elements from the specified namespace. According to some aspects, a containment node or a container is a node that contains child elements within a subtree filter. For each containment node specified in a subtree filter, all data model instances which are exact matches for the specified namespaces and element hierarchy are included in the filter output.

According to some aspects, a content match node is a leaf node that contains simple content within a subtree filter. In some aspects, a content match node is used to select some or all of its relevant nodes for filter output and represents an exact-match filter of the leaf node element content. According to some aspects, a selection node is an empty leaf node within a subtree filter. A selection node may represent an explicit selection filter of the underlying data model. The presence of any selection nodes within a set of sibling nodes may cause the filter to select the specified subtrees and suppress the automatic selection of the entire set of sibling nodes in the underlying data model. Furthermore, to accurately perform an XSLT transformation and format data into a preferred format, configuration file 200 provides information, corresponding to YANG modules, that is specific to the level of a leaf node element.

According to some aspects, a container may contain multiple child lists (e.g., multiple lists of selection nodes). If more than one child list contains elements to retrieve, a NETCONF client user may create multiple container structures using unique aliases. According to some aspects, to create a container structure using an alias, a client user may add a unique alias to the container's namespace and then copy a child list to the container structure. Each alias can act as a separate container or grouping structure and enables the XSLT builder process to keep the data corresponding to each child list separate. Each alias can act as a separate container or grouping structure and enables the XSLT builder process to keep the data corresponding to each child list separate. Furthermore, in some aspects, if the list containers are not aliased when a container has multiple child lists, the data corresponding to the multiple child list may end up data sequentially on the same line once the XSLT transformation is performed. Collection systems may not be able to process the data when the data corresponding to the multiple child lists is combined.

As shown in the exemplary embodiment of FIG. 2, NETCONF configuration file 200 includes three container or containment nodes (e.g., containers 202, 204, and 206). The first container 202, named "system," is associated with the namespace "http://example.net/yang/system." Nested within the "system" container can be another container named "config." The nested container "config" can include a selection node "hostname." The second container 204, named "test-qos," can have a unique alias "alias1" and is associated with namespace "urn:test:level:xml:ns:yang:test_ns::example-test-qos." The second container 204 can have a containment node, "list_name1" nested within it. The nested container "list_name1" can include the following selection nodes: "name," "cir" (committed information rate), "cbs" (committed burst size), "eir" (excess information rat), and "ebs (excess burst size)."

In some aspects, the third container 206, "test-qos," has a unique alias "alias2" and is associated with namespace "urn:test:level:xml:ns:yang:test_ns::example-test-qos." The third container can have a containment node, "list_name2" nested within it. The nested container "list_name2" can include the following selection nodes: "name," "element1," and "instance-id." According to some aspects, each network element that receives the "get-conf" RPC responds with an <rpc-reply> message. The received data can then be transformed into a preferred data ingestion format and/or layout correspond to the data processing tool.

Figure 3:
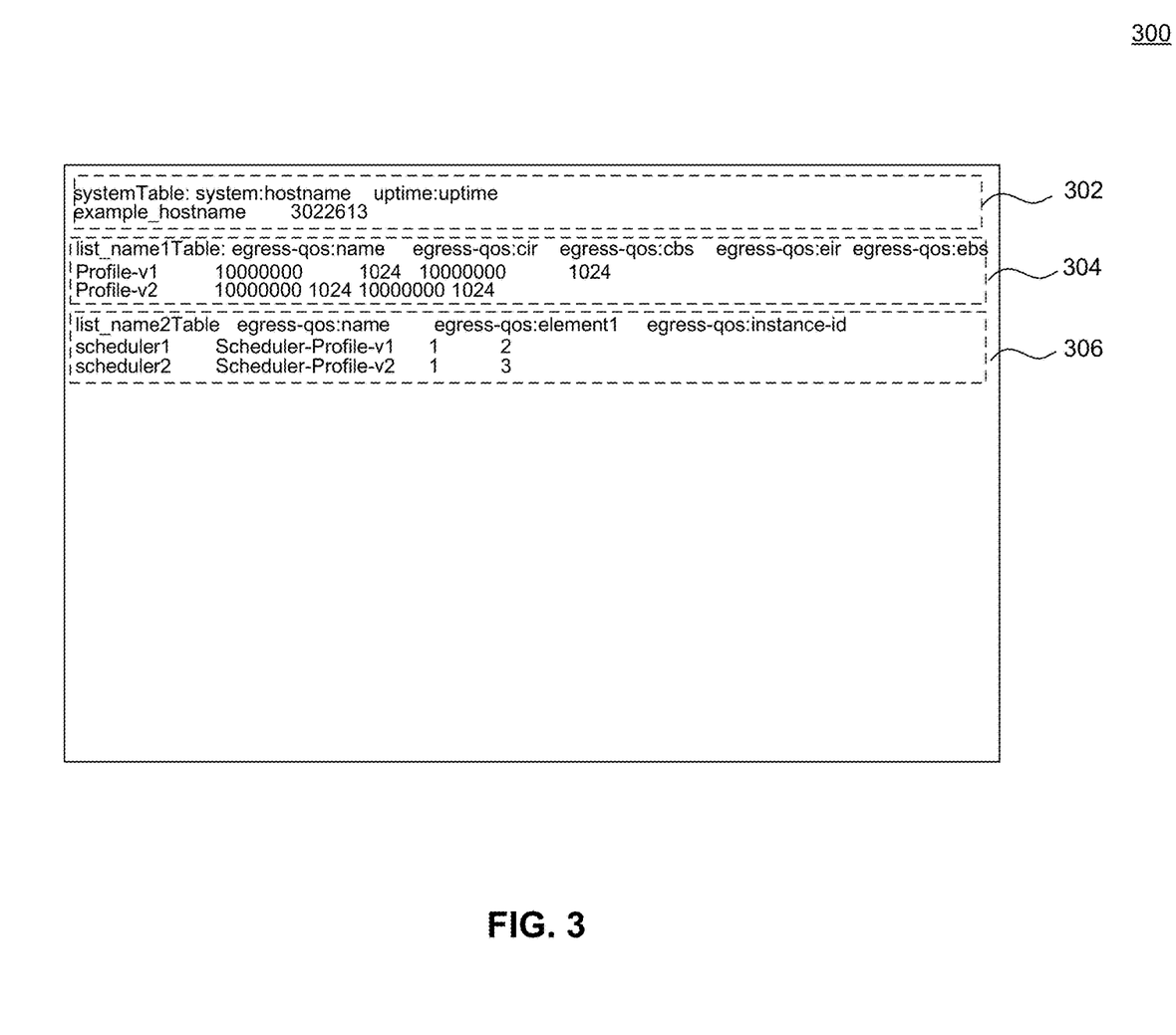
FIG. 3 illustrates an exemplary output obtained by transforming the reply data obtained from a network element using the generated XSLT file, according to some aspects of this disclosure.

FIG. 3 illustrates an exemplary output 300 obtained by transforming the reply data obtained from a network element using the generated XSLT file, according to some embodiments. According to some aspects, after processing the RPC request from the NETCONF client, the NETCONF server encapsulates the responses into a reply RPC encoded in XML. The YANG based server response can be transformed using a dynamically generated XSLT file into a preferred data-ingestion format and/or layout.

In some aspects, table 302 can correspond to the YANG container "system" in NETCONF configuration file 202. The "system" container can include a "config" container with a selection node "hostname." Accordingly, "hostname" nodes in the "http://example.net/yang/system" namespace which occur within a "config" container element of the network element's configuration data store can be received in the "get-RPC" reply message. The first column of table 302 corresponds to the host name. The "system container" can also include a "state" tag to retrieve state data (e.g., uptime information) from the "http://www.augument.com/ns/yang/augment-uptime" namespace. The second of table 302 corresponds to the uptime value returned by the NETCONF server.

In some aspects, table 304 corresponds to the YANG container "test-qos" with alias "alias1" in configuration file 202. The "test-qos" container can include a containment node, "list_name1" nested within it. Accordingly, "list_name1" nodes in the "urn:test:level:xml:ns:yang:test_ns::example-test-qos" namespace which occur within the aliased "test-qos" container element of network element's configuration data store can be received in the "get-RPC" reply message. "Profile-v1" and "Profile-v2" may correspond to the identified "list_name1" nodes in the namespace. Each "list_name1" container may further include the following selection nodes: "name," "cir" (committed information rate), "cbs" (committed burst size), "eir" (excess information rat), and "ebs (excess burst size)." In table 304, the data elements in the first row may correspond to the values of the specified selection nodes which occur within the "Profile-v1" container and the data elements in the second row may correspond to the values of the specified selection nodes which occur within the "Profile-v2" container.

In some aspects, table 306 corresponds to the YANG container "test-qos" with alias "alias2" in configuration file 202. The "test-qos" container may include a containment node, "list_name2" nested within it. Accordingly, "list_name2" nodes in the "urn:test:level:xml:ns:yang:test_ns::example-test-qos" namespace which occur within the aliased "test-qos" container element of the network element's configuration data store can be received in the "get-RPC" reply message. "Scheduler1" and "Scheduler2" may correspond to the identified "list_name2" nodes in the namespace. Each "list_name2" container may further include the following selection nodes: "name," "element1," and "instance-id." In table 304, the data elements in the first row may correspond to the values of the specified selection nodes which occur within the "Scheduler1" container, and the data elements in the second row may correspond to the values of the specified selection nodes which occur within the "Scheduler2" container.

In some aspects, each aliased container groups the output into a distinct table (e.g., tables 304 and 306.) In table 304, the first row can be a header line that contains the top-level container name followed by the sub elements (e.g., selection nodes) separated by a delimiter. The rows of data elements can be created by looping through each "data-set' within the container's list and appending the individual leaves data to the same line separated by the delimiter. According to some aspects, once all data within the container is written, a single blank line is added. Then the next container's data can be written following the same format. Furthermore, if a container contains an alias, it is considered an individual table, and the alias can be be used in the header rather than the container name itself.

Figure 4:
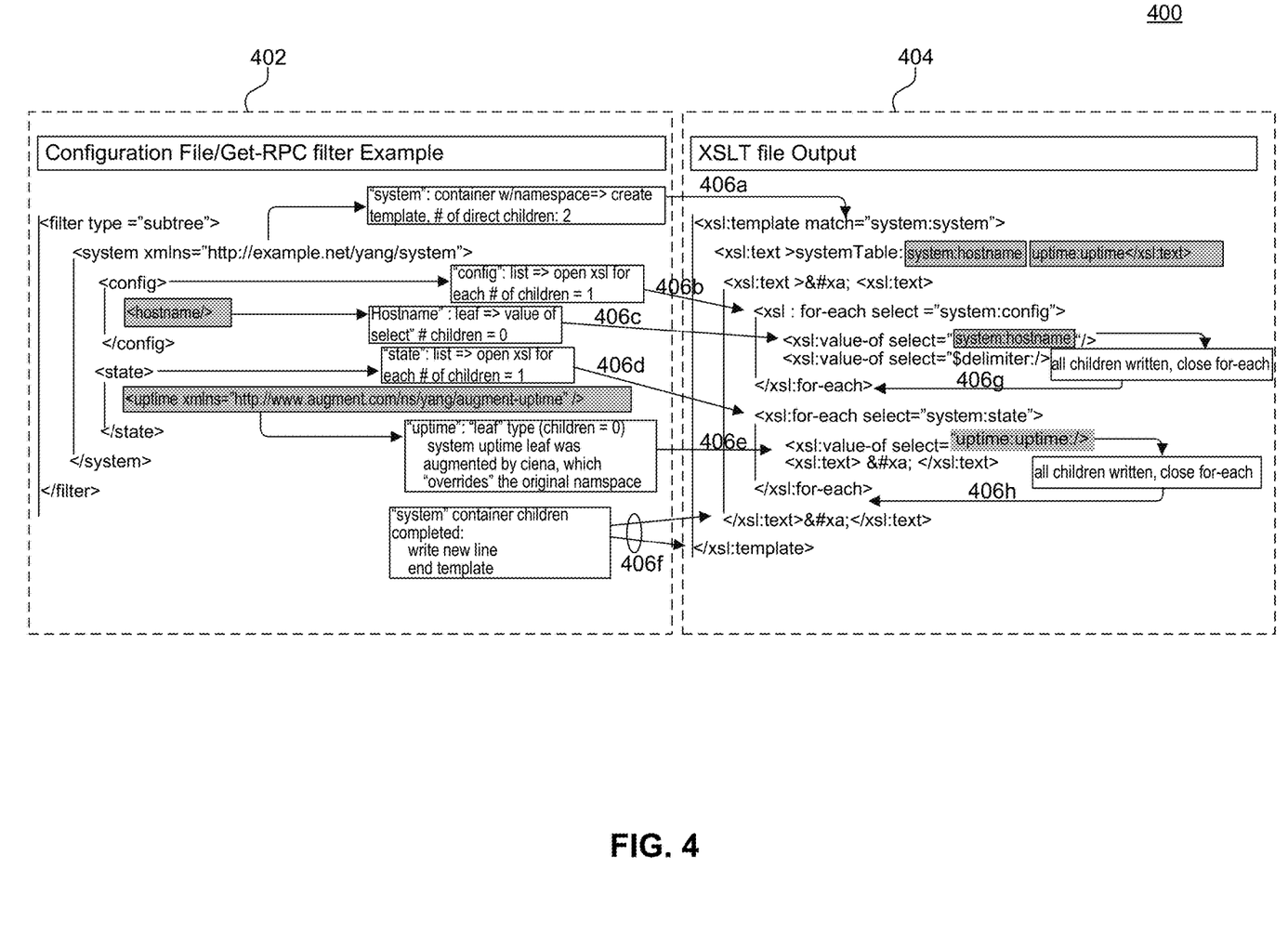
FIG. 4 illustrates an exemplary mapping for dynamically generating an XSLT file based on the configuration file, according to some aspects of this disclosure.

FIG. 4 illustrates an exemplary mapping for dynamically generating an XSLT stylesheet based on an example configuration file 402, according to some aspects. According to some aspects, an XSLT builder 114 can be implemented by a NETCONF manager 102. According to some aspects, an XSLT builder 114 can dynamically parse various XML elements of the configuration file 402 to generate an XSLT stylesheet 404 corresponding to the XML configuration file 402. The generation of an XSLT stylesheet 404 may be automatically triggered whenever changes are made to the configuration file 402.

According to some aspects, an XSLT builder application 114 may use an XML toolkit (e.g., python based lxml module) to create XSLT templates. According to some aspects, the XSLT builder 114 identifies the namespaces indicated in the XML configuration file. According to some aspects, the namespaces indicated in the configuration file 402 are included in the header of XSLT stylesheet 404. It then may iterate through each element of the configuration file, and build a data structure to house each top-level container, all sub-elements of the container as well as details of the hierarchy, namespace, and datatype of each sub-element. The XSLT builder may then loop through the data structure to create an XSLT template per each YANG container name. The XSLT builder may generate a header line corresponding to the name, its leaf elements, and a user-defined delimiter.

According to some aspects, configuration file 402 may include a container named "system" that is associated with the namespace "http://example.net/yang/system." According to some aspects, XSLT builder 114 may identify a container and create a corresponding template. According to some aspects, 406a illustrates the mapping corresponding to identifying the container name "system" and creating a corresponding XSLT template. The XSLT builder 114 may then build a header line based on the container name "system" and the leaf elements nested within the container "system" (e.g., containment nodes "hostname" and "uptime.").

According to some aspects, the XSLT builder may write the leaf elements nested within each container to the XSLT stylesheet based on the element's datatype. List type elements that have a child count greater than 0 may be written as an open XSL for-each type structure, while child leaf type elements that have elements with a child count of 0 may be written as XST "select-value-of" statements proceeded by a delimiter. According to some aspects, 406b illustrates the mapping corresponding identifying that the leaf element "config" has a child count greater than 0 and adding the leaf element to the XSLT stylesheet 404 as an open XSL for-each type structure. According to some aspects, 406c illustrates the mapping corresponding to identifying that the child leaf element "hostname" has a child count of 0 and adding the child leaf element to the XSLT stylesheet 404 as an XSL "select-value-of" statements proceeded by a delimiter. Similarly, 406d illustrates the mapping corresponding to identifying that the leaf element "state" has a child count greater than 0 and adding the leaf element to the XSLT stylesheet 404 as an open XSL for-each type structure, according to some aspects. Furthermore, 406e illustrates the mapping corresponding to identifying that the child leaf element "uptime" has a child count of 0 and adding the child leaf element to the XSLT stylesheet 404 as an XST "select-value-of" statement proceeded by a delimiter, according to some aspects. Once all child leaf elements are added and written to the XSLT stylesheet 404, the for-each type structures can be closed as illustrated by 406g and 406h, in FIG. 4.

According to some aspects, since there can be multiple layers of lists and/or child elements, the depth of each for-each list can be monitored and closed recursively once all child elements paired with their respective namespace names are written to the XSLT template. The template can then be closed, and each following container from the configuration file can be evaluated in using the same procedure. According to some aspects, 406f illustrates closing the XSLT template corresponding to the "system" container. According to some aspects, the aliased lists within a container can be addressed in much the same way. However, when a single template for the container is built, then an XSL if statement matching the alias name may be written for each aliased list structure in the XSLT file which will contain the header and the various children elements.

According to some aspects, the collection script can be implemented in python using ncclient and lxml python modules. According to some aspects, the ncclient may be used as a framework to establish a NETCONF client connection to a network element and send and receive RPCs between one or more target network elements and the collection system of the network management system. According to some aspects, an lxml python module may be used to provide the methods to read an XML file and perform an XSLT transformation that transforms a raw XML into the text-delimited output file.

Figure 5:
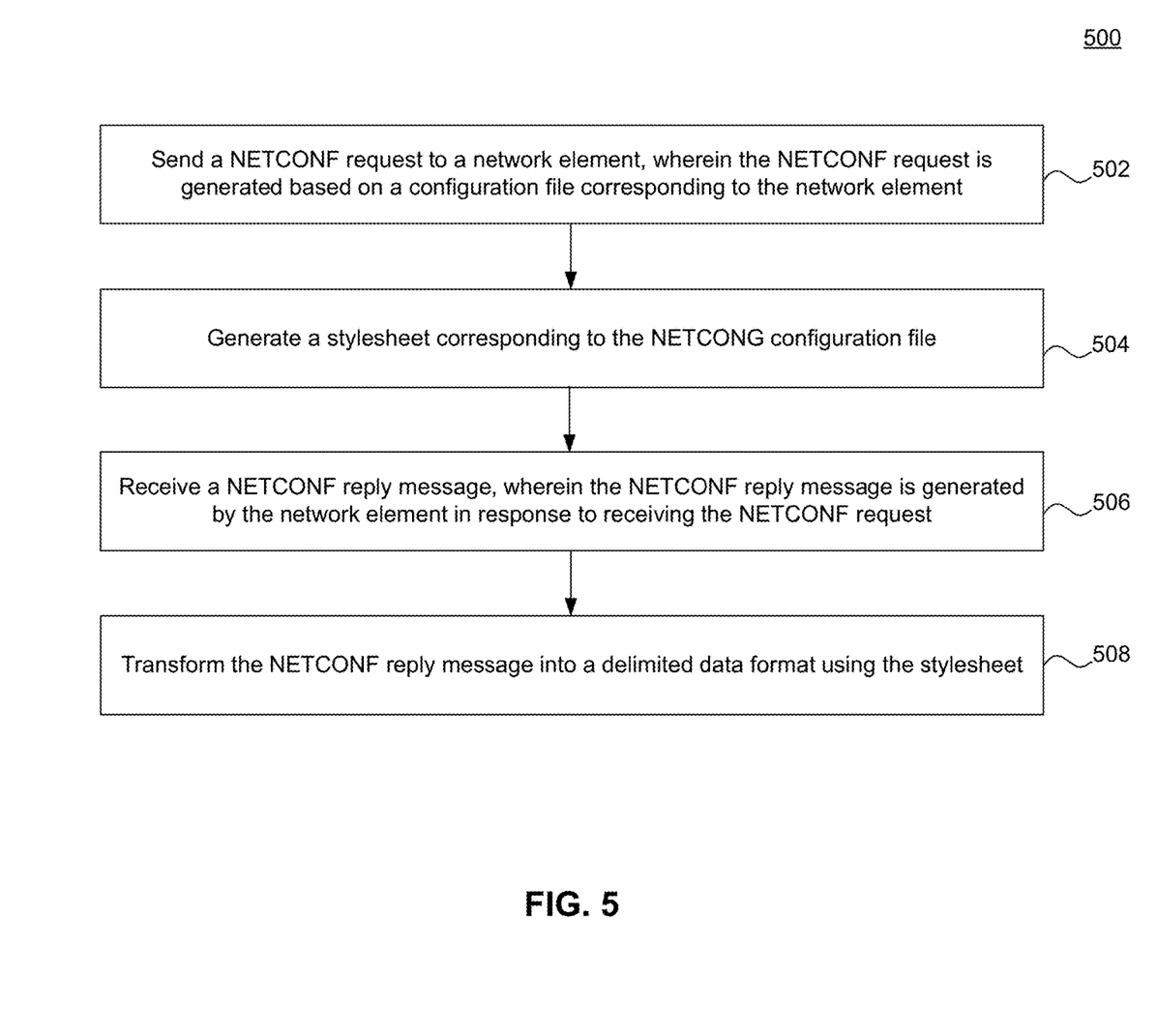
FIG. 5 is a flowchart for a method for template XSLT-based NETCONF data collector, according to some embodiments.

FIG. 5 is a flowchart for a method for template XSLT based NETCONF data collector, according to some aspects of this disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to those examples.

In 502, the NETCONF manager may send a NETCONF request to a type network element and a second network element, where the NETCONF request is generated based on a configuration file corresponding to the first network element and the second network element. According to some aspects, the first network element and the second network element can be different types of network elements having common YANG modules. According to some aspects, the first network element and the second network element can be network devices from different manufacturers. According to some aspects, the first network element and the second network element can be different types of routers (e.g., edge router, core router, and/or the like). According to some aspects, the first network element and the second network element can be different types of aggregator devices (e.g., a broadband network gateway (BGN), a Broadband Remote Access Server (B-RAS), and/or the like. According to some aspects, the NETCONF request may use elements of configuration file 200 as a filter. According to some aspects, NETCONF client 112 may read in the configuration file 200 as a string and set a filter element in the NETCONF request to one or more components of the string corresponding to the read-in configuration file 200. According to some aspects, the configuration file 200 can be formatted as a plurality of yet another next generation (YANG) data modules. NET- CONF configuration file uses an XML subtree filtering that may comprise one or more subtree filters.

According to some aspects, before NETCONF manager sends a NETCONF request to a first type network element and a second type network element, a NETCONF session may be established between a NETCONF client module at the network management device and a NETCONF server module at the first type network element. Similarly, a NETCONF session may be established between a NETCONF client module at the network management device and a NETCONF server module at the second type network element. According to some aspects, the NETCONF request may be a GET remote procedure call (RPC). According to some aspects, the first type network device and the second type network device may be from different manufacturers. Furthermore, the network devices may be a switch or a router.

In 504, NETCONF manager 102 may receive a first NETCONF reply message and a second NETCONF reply message, where the first NETCONF reply message may be generated by the first network element in response to receiving the NETCONF request and the second NETCONF reply message may be generated by the second network element in response to receiving the NETCONF request. According to some aspects, the first NETCONF reply message and the second NETCONF message include similar types of operational information and/or configuration information from the first and the second network elements.

In 506, in response to successfully receiving a NETCONF reply, an XSLT builder at the NETCONF manager generates a stylesheet corresponding to the NETCONF configuration file. According to some aspects, the stylesheet may be in an extensible stylesheet language transformations (XSLT) format. According to some aspects, the stylesheet may comprise a plurality of templates, wherein each template of the plurality of templates corresponds to a respective YANG data module of the plurality of YANG data modules. According to some aspects, an XSLT builder may be implemented by a NETCONF manager 102. Furthermore, an XSLT builder dynamically may parse various XML elements of a configuration file to generate an XSLT file corresponding to the XML configuration file. According to some aspects, the generation of an XSLT file may be automatically triggered whenever changes are made to the configuration file. According to some aspects, the collection script used by an XSLT builder may be implemented in python using ncclient and lxml python modules.

In 508, the NETCONF reply message may be transformed into a delimited data format using the stylesheet. According to some aspects, the data in the delimited data format can be input to network optimization tool to further optimized the network 100. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Figure 6:
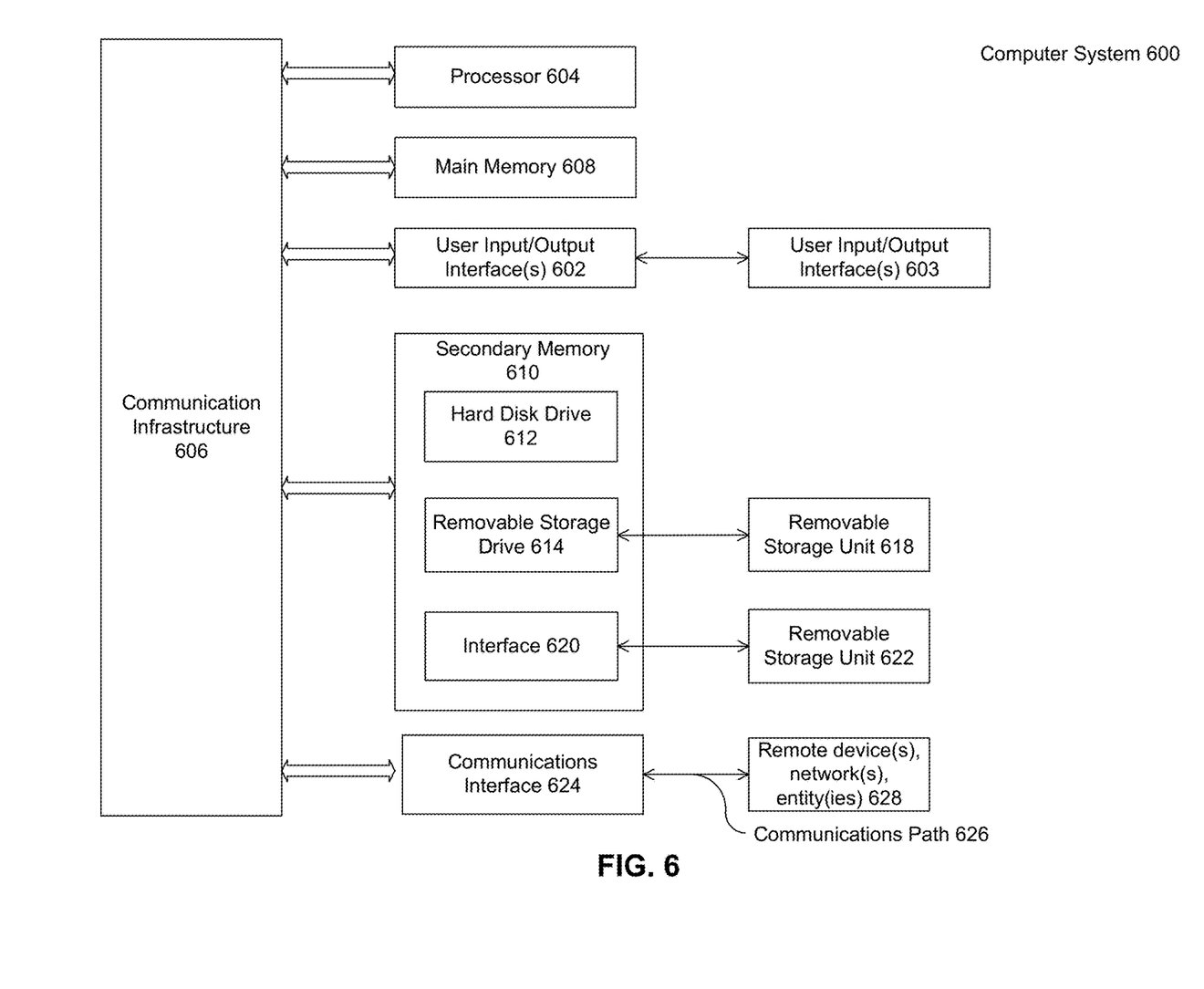
FIG. 6 is an example computer system useful for implementing various embodiments.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

sending, by a network management device, a network configuration protocol (NETCONF) request to a first network element of a first type and a second network element of a second type, wherein the first type is different from the second type, and wherein the NETCONF request is generated based on a NETCONF configuration file corresponding to the first type and the second type, and wherein the NETCONF request is a request for data corresponding to an operational bandwidth of at least one of the first network element or the second network element and a volume of traffic experienced by the at least one of the first network element or the second network element;

receiving, by the network management device, a first NETCONF reply message and a second NETCONF reply message, wherein the first NETCONF reply message is generated by the first network element in response to receiving the NETCONF request and the second NETCONF reply message is generated by the second network element in response to receiving the NETCONF request;

generating a stylesheet corresponding to the NETCONF configuration file, wherein the stylesheet comprises a plurality of templates and generating the stylesheet includes:

identifying a particular container associated with the NETCONF configuration file;

generating a template of the plurality of templates by:

writing at least one leaf element associated with one or more corresponding data nodes and based on a corresponding datatype and a child count for the at least one leaf element; and generating the stylesheet based on the plurality of templates; and transforming the first NETCONF reply message and the second NETCONF reply message into a delimited data format using the stylesheet.

2. The method of claim 1, wherein sending the NETCONF request further comprises:

establishing a NETCONF session between a NETCONF client module at the network management device and a NETCONF server module at the first network element; and establishing a NETCONF session between a NETCONF client module at the network management device and a NETCONF server module at the second network element.

3. The method of claim 1, wherein:
the NETCONF configuration file is formatted as a plurality of yet another next generation (YANG) data modules; and
each template of the plurality of templates corresponds to a respective YANG data module of the plurality of YANG data modules.

4. The method of claim 1, wherein the stylesheet is in an extensible stylesheet language transformations (XSLT) format.

5. The method of claim 1, wherein the NETCONF request is a GET remote procedure call (RPC).

6. The method of claim 1, wherein the first network element and the second network element are from different manufacturers.

7. A network management system, comprising:
a memory comprising instructions; and
at least one processor coupled to the memory, the instructions configured cause the at least one processor to:
send a network configuration protocol (NETCONF) request to a first network element of a first type and a second network element of a second type, wherein the first type is different from the second type, and wherein the NETCONF request is generated based on a NETCONF configuration file corresponding to the first type and the second type, and wherein the NETCONF request is a request for data corresponding to an operational bandwidth of at least one of the first network element or the second network element and a volume of traffic experienced by at least one of the first network element or the second network element;
receive a first NETCONF reply message and a second NETCONF reply message, wherein the first NETCONF reply message is generated by the first network element in response to receiving the NETCONF request and the second NETCONF reply message is generated by the second network element in response to receiving the NETCONF request;
generate a stylesheet corresponding to the NETCONF configuration file, wherein the stylesheet comprises a plurality of templates and generating the stylesheet includes:
identifying a particular container associated with the NETCONF configuration file;
generating a template of the plurality of templates by:
writing at least one leaf element associated with one or more corresponding data nodes and based on a corresponding datatype and a child count for the at least one leaf element; and
generating the stylesheet based on the plurality of templates; and
transform the first NETCONF reply message and the second NETCONF reply message into a delimited data format using the stylesheet.

8. The network management system of claim 7, wherein to send the NETCONF request, the at least one processor is further configured to:

establish a NETCONF session between a NETCONF client module at the network management system and a NETCONF server module at the first network element; and
establish a NETCONF session between a NETCONF client module at the network management system and a NETCONF server module at the second network element.

9. The network management system of claim 7, wherein:
the NETCONF configuration file is formatted as a plurality of yet another next generation (YANG) data modules; and
each template of the plurality of templates corresponds to a respective YANG data module of the plurality of YANG data modules.

10. The network management system of claim 7, wherein the stylesheet is in an extensible stylesheet language transformations (XSLT) format.

11. The network management system of claim 7, wherein the NETCONF request is a GET remote procedure call (RPC).

12. The network management system of claim 7, wherein the first network element and the second network element are from different manufacturers.

13. A non-transitory computer-readable medium having instructions stored thereon that, when executed by at least one computing device, cause the at least one computing device to perform operations comprising:
sending a network configuration protocol (NETCONF) request to a first network element of a first type and a second network element of a second type, wherein the first type is different from the second type, and wherein the NETCONF request is generated based on a NETCONF configuration file corresponding to the first type and the second type, and wherein the NETCONF request is a request for data corresponding to an operational bandwidth of at least one of the first network element or the second network element and a volume of traffic experienced by at least one of the first network element or the second network element;
receiving a first NETCONF reply message and a second NETCONF reply message, wherein the first NETCONF reply message is generated by the first network element in response to receiving the NETCONF request and the second NETCONF reply message is generated by the second network element in response to receiving the NETCONF request;
generating a stylesheet corresponding to the NETCONF configuration file, wherein the stylesheet comprises a plurality of templates and generating the stylesheet includes:
identifying a particular container associated with the NETCONF configuration file;
generating a template of the plurality of templates by:
writing at least one leaf element associated with one or more corresponding data nodes and based on a corresponding datatype and a child count for the at least one leaf element; and
generating the stylesheet based on the plurality of templates; and
transforming the first NETCONF reply message and the second NETCONF reply message into a delimited data format using the stylesheet.

14. The non-transitory computer-readable medium of claim 13, wherein the at least one computing device is a network management device and sending the NETCONF request comprises:

establishing a NETCONF session between a NETCONF client module at the network management device and a NETCONF server module at the first network element; and establishing a NETCONF session between a NETCONF client module at the network management device and a NETCONF server module at the second network element.

15. The non-transitory computer-readable medium of claim 13, wherein:

the NETCONF configuration file is formatted as a plurality of yet another next generation (YANG) data modules; and each template of the plurality of templates corresponds to a respective YANG data module of the plurality of YANG data modules.

16. The non-transitory computer-readable medium of claim 13, wherein the stylesheet is in an extensible stylesheet language transformations (XSLT) format.

17. The method of claim 1, wherein the NETCONF configuration file includes a subtree filter indicating namespace, and wherein the first NETCONF reply message comprises configuration data of the first network element corresponding to the indicated namespace, and wherein the second NETCONF reply message comprises configuration data of the second network element corresponding to the indicated namespace.

* * * * *